United States Patent [19]
Clement et al.

[11] Patent Number: 4,709,773
[45] Date of Patent: Dec. 1, 1987

[54] VARIABLE GEOMETRY TRACK VEHICLE

[75] Inventors: Gilles Clement, Paris; Eric Villedieu, Palaiseau, both of France

[73] Assignee: Commissariat a l'Energie Atomique, Paris, France

[21] Appl. No.: 875,325

[22] Filed: Jun. 17, 1986

[30] Foreign Application Priority Data

Jun. 21, 1985 [FR] France .................. 85 09485

[51] Int. Cl.$^4$ .................................. B62D 55/04
[52] U.S. Cl. ........................... 180/9.32; 280/5.2; 280/5.28
[58] Field of Search ............... 180/7.1, 9.32, 907; 280/5.2, 5.28, DIG. 10, 6 H, 6.1, 6.11

[56] References Cited
U.S. PATENT DOCUMENTS

| | | | |
|---|---|---|---|
| 3,127,188 | 3/1964 | Greub | 280/5.22 |
| 3,869,011 | 3/1975 | Jensen | 280/5.22 |
| 4,226,292 | 10/1980 | Monte et al. | 180/9.32 |
| 4,566,551 | 1/1986 | Feliz | 180/907 |

FOREIGN PATENT DOCUMENTS

| | | |
|---|---|---|
| 2302901 | 1/1976 | France . |
| 58-161673 | 9/1983 | Japan . |
| 58-164482 | 9/1983 | Japan . |

Primary Examiner—John J. Love
Assistant Examiner—Donn McGiehan
Attorney, Agent, or Firm—Pearne, Gordon, McCoy & Granger

[57] ABSTRACT

The vehicle comprises two tracked bodies and one non-tracked body articulated about a common axis. Each tracked body comprises two laterally positioned tracks. The engines are carried by tracked bodies, one of them supporting an engine or motor driving the tracks located on one side of the vehicle and a motor or engine controlling the articulation of the tracks bodies with respect to one another, whereas the other tracked body supports a motor or engine for driving the tracks located on the other side of the vehicle and an engine or motor controlling the orientation of the non-tracked body about the axis. The non-tracked body supports the main useful load.

2 Claims, 8 Drawing Figures

FIG. 4
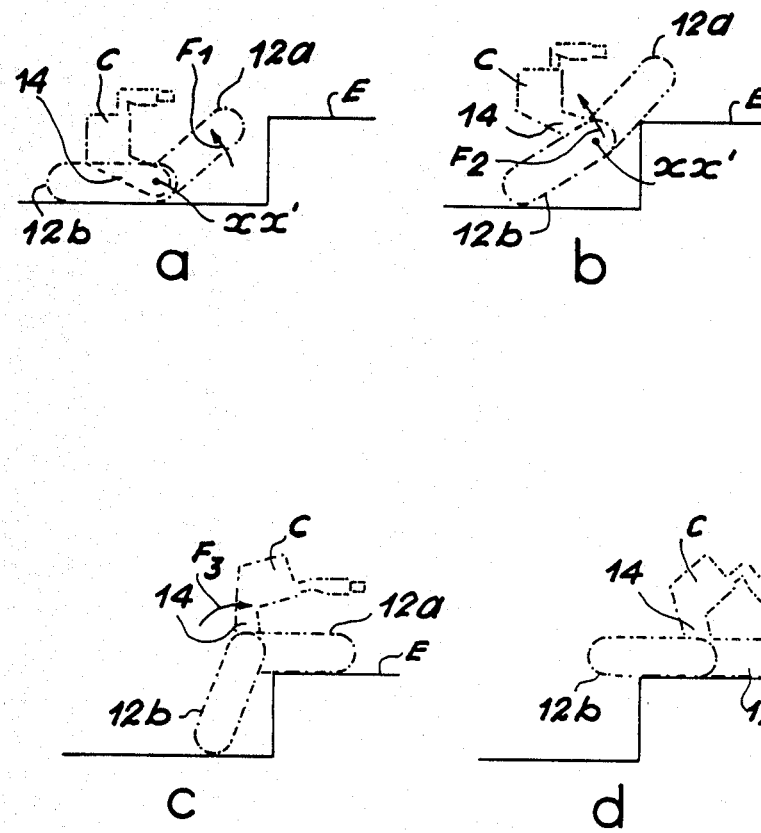
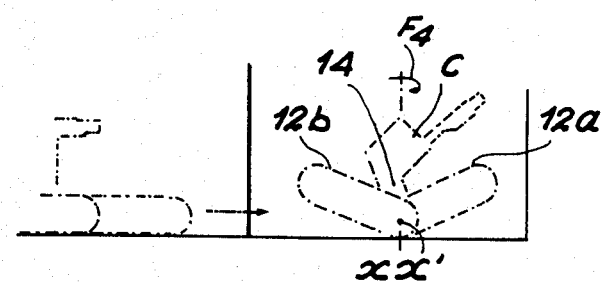
FIG. 5

VARIABLE GEOMETRY TRACK VEHICLE

BACKGROUND OF THE INVENTION

The present invention relates to a variable geometry tracked vehicle designed so as to be able to move, optionally whilst transporting a load, on a path defined as being the natural path of man within an installation.

More specifically, the tracked vehicle according to the invention is more particularly designed in such a way as to be able to clear doors, move up or down staircases having several flights of stairs, take elevators and clear or get round minor obstacles.

This vehicle must also be able to transport operational modules appropriate for each mission to be fulfilled, whereby said missions can vary widely and in particular cover the inspection, dismantling or decontamination of a nuclear installation and fire fighting.

Existing tracked vehicles will now be described and discussed. For this purpose, said vehicles will be discussed as a function of the number of tracks, as well as the internal or external non-tracked bodies and caterpillared bodies thereof. A tracked body is being defined as a non-deformable solid, which directly participates in supporting one or more tracks, whereas a non-tracked body is defined as a non-deformable solid which does not support a track. A non-tracked body is said to be external if it constitutes an appendage and internal if it constitutes an intermediate connecting element between several tracked bodies.

On the basis of these definitions, the simplest known vehicles are those having two tracks integral with a single tracked body. Conventional military assault tanks and certain civil, military or nuclear tanks fall into this category. In their basic concept, these vehicles are particularly unstable, because they have no active means for controlling the posture or attitude, i.e. the shape or form of the vehicle, the position of its centre of gravity with respect to support points and the orientation of the inertia with respect to said support points.

As is more particularly illustrated by French Pat. No. 2 450 191, the stability of vehicles of this type can be improved by articulating on the tracked body a non-tracked body supporting the useful load. In this case, it is possible by moving the centre of gravity of the vehicle by pivoting the useful load, to improve the stability thereof when it is moving along a slope.

Certain of the vehicles belonging to this first category are able to take staircases. However, their performances are limited by the fact that, by their very nature, they have no intrinsic posture or attitude control, i.e. the attitude cannot be controlled if the vehicle has no external non-tracked body. Thus, there is a risk of turning over when clearing a marked obstacle, such as the nosing of a stair, as a result of lack of control of the centre of gravity position. Moreover, the vehicle can drop suddenly after clearing a peculiar point, particularly when arriving on the landing of a staircase. Moreover, on increasing the vehicle length, so that it can remain stable on the nosings of stairs, said increase in the overall dimensions of the vehicle is prejudicial when it arrives on landings, which makes it necessary to perform a half or quarter turn on the spot in a space which can be extremely limited.

A second type of tracked vehicle is illustrated by French Pat. No. 2 523 914. This is a vehicle having two variable configuration tracked and five caterpillar bodies constituted by a central body and two systems of articulated rods having two segments. This vehicle is in fact a variant of the first type of vehicle referred to hereinbefore, where an intrinsic attitude control is possible in the frontal plane.

Apart from its complex construction, this vehicle suffers from the disadvantage that it is difficult to obtain the large overlength on the ground necessary for the stability of the vehicle on a staircase. Moreover, the lateral guidance of the tracks is difficult to bring about and it is possible for the latter to be removed. Finally, the deformation of the tracks prevents any intermediate guidance between the pulleys, so that it is possible for the tracks to sink into an obstacle when their rigidity is not sufficient.

A third known tracked vehicle type has four caterpillars, each mounted independently on a track body, the four tracked bodies being articulated on an internal non-tracked central body. Such a vehicle is more particularly illustrated by Japanese patent application No. 83-804 872/44. The independent articulation of each of the tracked bodies on the central non-tracked body gives this vehicle particularly interesting possibilities for the intrinsic control of the attitude.

Although said means is very ingenious, it suffers from the disadvantage that the non-tracked central body can rub or even jam on a pointed object when clearing the same. Moreover, there is an interlink between the functions of varying the configuration (making it possible to adapt to the ground) and the intrinsic control of the attitude (making it possible to control the centre of gravity position). Therefore, when the vehicle moves on a slope, it is not possible to simultaneously ensure an optimum configuration of the tracked bodies and a modification of the attitude of the load e.g. making it possible to keep same horizontal.

Another vehicle is known, which has four tracked mounted in pairs on two tracked bodies articulated about a common axis. The "Spider" vehicle of the British organisation AERE Harwell belongs to this category. Compared with the previously mentioned vehicle having an intermediate non-tracked body, said vehicle makes it possible to eliminate the problem of clearing a pointed obstacle. However, this vehicle still suffers from the disadvantage of having few intrinsic attitude control possibilities, the two front tracks only constituting a clearing aid not making any significant modification possible to the centre of gravity of the complete vehicle. Moreover, said vehicle is not reversible, i.e. it is necessary for it to make a half turn in order that it can take any obstacle located to the rear.

Another known tracked vehicle has six caterpillars mounted in pairs on three tracks bodies directly articulated to one another. This vehicle, called the "Marauder" manufactured by the British company Morfax, corresponds to the preceding vehicle in which a supplementary tracked train has been added at the rear to make the vehicle symmetrical. Although this eliminates the disadvantage of non-reversibility of the previously mentioned vehicle, the possibilities of intrinsically controlling the attitude remain limited and the presence of three tracked trains makes this vehicle relatively complex.

SUMMARY OF THE INVENTION

The present invention relates to an articulated tracked vehicle of a particularly simple design, involving a minimum of motorization means and having the essential advantages of various known tracked vehicles, without suffering from their disadvantages. Moreover, the invention relates to a vehicle having a good stability no matter what its attitude, due to the position control of its centre of gravity and the location of its motorization means.

The present invention therefore specifically relates to a tracked vehicle comprising two to four tracked bodies and at least one non-tracked body, each of the track bodies having at least one caterpillar, the total number of tracks of the vehicle being three or four, the tracked bodies and the non-tracked bodies all being articulated about a common axis, wherein the vehicle also comprises means for permanently maintaining the vertical passing through the centre of gravity of the vehicle within the support polygon thereof and motorization means carried by the tracked bodies and placed within envelopes defined by the tracks of said tracks bodies.

Apart from the design simplicity of the vehicle, it is clear that it combines the advantages of existing tracked vehicles without suffering from the disadvantages thereof. As this vehicle belongs to the category of those having three or four tracks articulated about a common axis, it is able to modify its configuration. Thus, the tracks can all bear when it is wished to have a good stability and adhesion, e.g. when clearing a flight of stairs or when clearing the final step and arriving on the landing. However, certain caterpillars can be bent or folded back when it is wished to reduce the overall dimensions of the vehicle when travelling along landings.

Moreover, the presence of at least one external non-tracked body makes it possible to modify the position of the centre of gravity of the vehicle without interacting on the configuration of the tracked bodies. This makes it possible to permanently position the centre of gravity in a zone ensuring vehicle stability.

The articulation of the external non-tracked body carrying a load about an axis coinciding with the articulation axis or axle of tracked bodies may make it possible to adopt an attitude in which the tracks are slightly raised and the centre of gravity positioned vertically of the articulation axis. This position permits an in situ pivoting of the vehicle making it possible to obtain a great manoeuvrability on flat land similar to that of wheeled vehicles.

Finally, the advance motorization means of the tracks and the angulation motorization means of the tracked bodies and non-tracked body about the common axis are all carried by the tracked bodies and located within envelopes defined by the tracks. Thus, the non-tracked body is lightened and freed from all hinderances for transporting the main useful load. The useful load or any other complementary equipment of the vehicle (batteries, control, monitoring means, etc.) can also be distributed in the space remaining free between the tracked modules of each of the tracked bodies. Moreover, there is a better weight distribution on the vehicle and the empty centre of gravity is lowered, which is favourable from the stability standpoint.

According to a preferred embodiment of the invention, the means for maintaining the vertical passing through the centre of gravity within the support polygon are control means acting on an angulation motorization means of the non-tracked body about the common axis for making said angulation dependent on a position reference.

Preferably, the control means are sensitive to signals supplied by relative positioning sensors between the tracked bodies and non-tracked bodies and by a vertical position sensor carried by one of these bodies.

The vehicle according to the invention can in particular comprise two tracked bodies each having two caterpillars, a first of the tracked bodies carrying an advance motorization means for the tracks placed on the same side of the vehicle and an angulation motorization means between the actual tracked bodies, the second second tracked body carrying an advance motorization means for the tracks placed on the other side of the vehicle and an angulation motorization means for the tracked body with respect to said second caterpillared body. This particularly simple configuration makes it possible to limit to four the number of motorization means, whilst still making it possible to achieve the initially fixed objective, which was mainly the clearing of staircases with several flights of stairs, minor obstacles and doors.

BRIEF DESCRIPTION OF THE DRAWINGS

A description will now be provided in a non-limitative manner of a preferred embodiment with reference to the attached drawings, wherein show:

FIGS. 4a Diagrammatically different sequences of the to 4d rise of the vehicle of FIGS. 1 to 3 up a step.

FIG. 5 Diagrammatically a particular attitude of the vehicle of FIGS. 1 to 3 facilitating an in situ pivoting thereof.

DETAILED DESCRIPTION OF THE INVENTION

Figure 2:
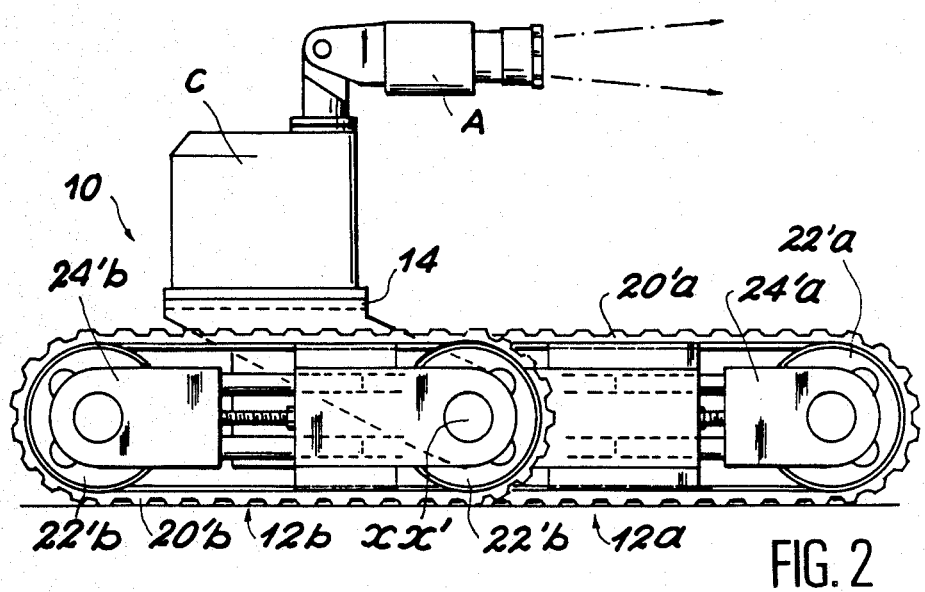
FIG. 2 A side view of the vehicle shown in FIG. 1.
Figure 1:
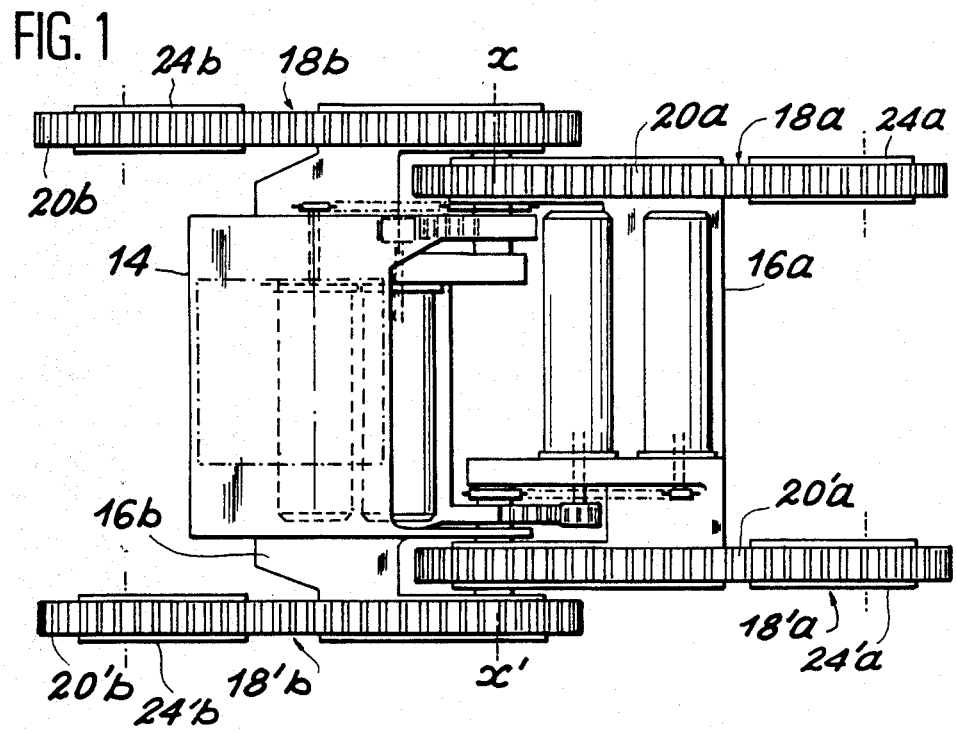
FIG. 1 A plan view of a preferred embodiment of the vehicle according to the invention.
Figure 3:
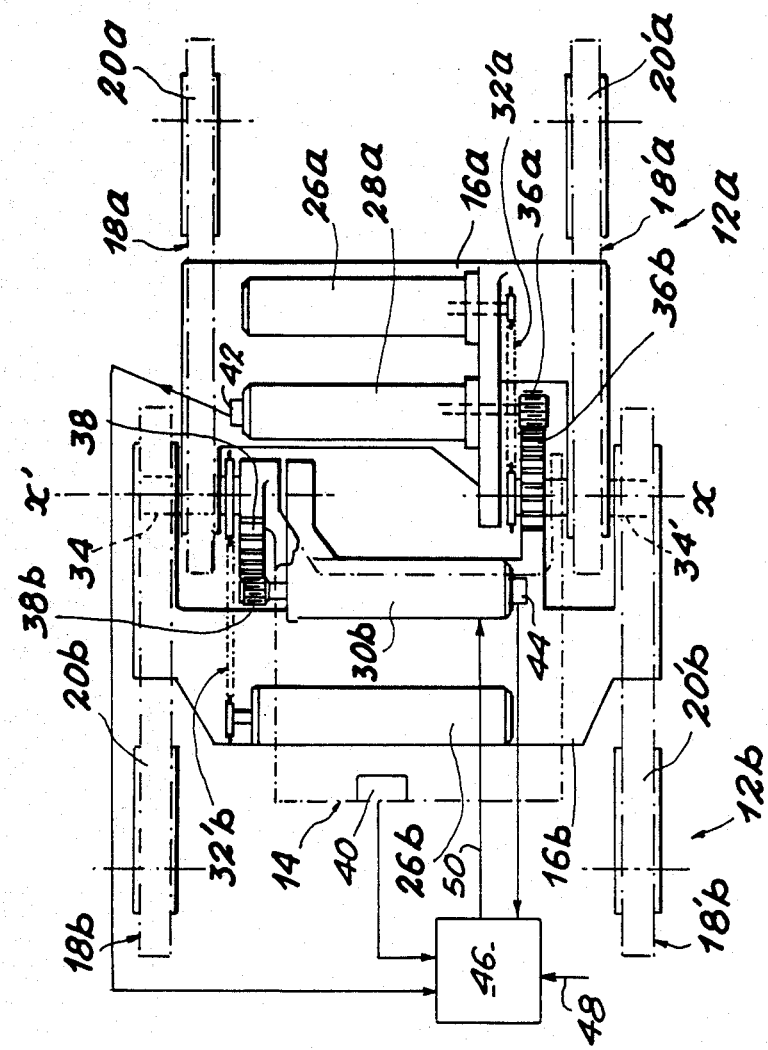
FIG. 3 A larger scale plan view more particularly illustrating the location of the motorization means on the vehicle.

In the preferred embodiment shown in FIGS. 1 to 3, the vehicle 10 according to the invention comprises two tracked bodies 12a, 12b, which will be respectively called the front tracked body and rear-tracked body, although the vehicle is reversible and can therefore travel in the opposite direction. The vehicle also has a non-tracked body 14. According to an essential feature of the invention, the tracked bodies 12a, 12b and the non-tracked body 14 are reciprocally articulated about a single common axis or axle XX'. When the vehicle is on horizontal ground, said axis XX' is also horizontal and is positioned transversely with respect to the longitudinal axis of the vehicle.

Each of the tracked bodies 12a, 12b comprises a spacer 16a, 16b respectively connecting two tracked modules 18a, 18'a for tracked body 12a and 18b, 18'b for tracked body 12b. When the vehicle moves in a direction such that the tracked bodies 12a, 12b respectively constitute the front and rear of the vehicle, the tracked modules 18a, 18b are positioned to the left of the vehicle and the tracked modules 18'a, 18'b to the right of the vehicle.

Each of the tracked modules 18a, 18'a, 18b, 18'b is constructed in the same way. For this reason, only module 18a will now be described, the corresponding parts of the other modules being designated in the drawings by the same references followed by the index of the module corresponding thereto.

The tracked module 18a comprises a track 20a mounted on two wheels 22a (not visible in the drawings) ensuring in known manner the lateral holding or maintaining of the track. One of the wheels of each of the tracked modules is centred on the vehicle axis XX' and directly supported by a lateral extension of the corresponding spacer. As will be shown hereinafter, it is this wheel which ensures the driving of the corresponding tracked. The axles of the other wheels of each of the tracked modules are supported by a rigid structure 24a mounted in regulatable manner on spacer 16a, so as to ensure the tension of the corresponding track. Each of the tracked modules also has a not shown structure placed between the wheels and serving as a support for the lower part of the track which is in contact with the ground.

Bearing in mind the articulation of the two tracked bodies 12a, 12b about the common axis XX', the wheel base of one of these bodies (12a in FIG. 1) is below that of the other.

In the preferred embodiment of the invention shown in the drawings, the motorization means of the tracks and those used for articulating the tracked bodies 12a, 12b with respect to one another and the non-tracked body 14 about axis XX' are supported by the tracked bodies and placed within the envelope defined by the tracked modules of the corresponding tracked body. Moreover, the articulation of tracked bodies 12a, 12b about axis XX' makes it possible to drive the two tracks placed on the same side of the vehicle with the aid of a single motorization means ensuring both the propulsion and the direction changes of the vehicle.

More specifically and as is more particularly illustrated in FIG. 3, tracked body 12a supports by its spacer 16a a first propelling engine 26'a, e.g. used for simultaneously driving tracks 20'a and 20'b located on the right-hand side of the vehicle and a motor 28a e.g. used for controlling the reciprocal articulation of the tracked bodies 12a, 12b. In a comparable manner, spacer 16b of tracked body 12b supports a second propelling engine 26b, which in this case drives the tracks 18a, 18b located on the left-hand side of the vehicle and an attitude control engine 30b controlling the pivoting of the non-tracked body 14 about axis XX'.

The output shaft of engine 26a is connected by a transmission mechanism 32'a of a random known type, such as a toothed wheel and chain system, to a shaft 34' centred on axis XX' and to which are joined in rotation the wheels of the right-hand tracked modules 18'a, 18'b, which are also centred on said same axis XX'. Thus, the putting into action of engine 26a has the effect of simultaneously driving tracks 20'a and 20'b.

The driving of tracks 20a and 20b by engine 26b takes place in a completely identical manner via transmission mechanism 32b, which rotates axle 34 carrying the wheels of modules 18a, 18b centred on axis XX'.

Engine 28a for the reciprocal articulation of the tracked bodies carries on its output shaft a pinion 36a, which meshes on a toothed segment 36b formed on a yoke extending the spacer 16b of tracked body 12b. As a result of this configuration, it is clear that the putting into operation of engine 28 as the effect of pivoting the tracked bodies 12a, 12b with respect to one another about their articulation axis XX'.

Finally, the output shaft of engine 30b also carries a pinion 38b, which is engaged on a toothed or spur ring 38 formed on a yoke by which the non-tracked body 14 is pivotably supported on axle 34. Like the toothed segment 36b, toothed segment 38 is centred on the articulation axis XX' of the vehicle. Consequently, the putting into action of engine 30b has the effect of pivoting the non-tracked body 14 with respect to the tracked bodies about axis XX'.

In the embodiment shown in FIGS. 1 to 3, the non-tracked body 14 is in the form of a single plate, on which can be placed a load C (FIG. 2) adapted to the envisaged application. FIG. 2 also shows the case where the non-tracked body 14 supports an orientable camera A.

It is clear that the shape of the non-caterpillared body 14 could be modified and adapted as a function of the envisaged applications.

In order to in all cases ensure vehicle stability, the engine 30b controlling the slope of the non-tracked body 14 about axis XX' is made dependent so as to permanently keep the centre of gravity of the vehicle above the support polygon defined by tracks 20a, 20b, 20'a, 20'b.

For controlling this dependence, the vehicle is equipped with a vertical position sensor 40 (inclinometer or vertical position gyroscope) and position sensors 42, 44 for the different vehicle bodies.

Control circuit 46 compares the true position of the non-tracked body with respect to the vertical, said position being determined by sensors 40 to 44, with a position reference 48 of said body with respect to the vertical. A signal 50 representing the difference between the true value and the reference value is applied to engine 30b to cancel out said difference (FIG. 3).

The position reference 48 can be directly given by the operator. It can also be determined by a computer, e.g. located at a fixed control station. In the latter case, the more elaborate character of the control makes it possible to automatically clear obstacles.

In order to illustrate in exemplified manner the possibilities of the vehicle according to the invention, more particularly resulting from the separation of the attitude control and configuration variation functions of the vehicle, FIGS. 4a to 4d show different rise sequences on a step using the aforementioned vehicle.

It is to possible to see in FIG. 4 that on approaching step E, the front tracked body 12a can be raised (arrow $F_1$), the non-tracked body 14 supporting the load C being pivoted rearwards with respect to axis XX'.

As the front part of the tracked body 12a bears on step E, FIG. 4b shows that a reverse pivoting between the two tracked bodies (arrow $F_2$) tends to bring them into alignment with one another, whilst the start of tilting of the non-tracked body 14 carrying the load in the forwards direction makes it possible to reach a wait position.

The continuation of the two same movements and in particular the forward tilting of the non-tracked body 14 illustrated by arrow $F_3$ in FIG. 4c brings the lower face of the front tracked body 12a above step E.

As illustrated in FIG. 4d, the actuation of the tracked with the aid of engine 26a, 26b, as well as the restoration of the alignment of the two tracked bodies 12a, 12b enables the vehicle to continue its advance on step E.

Another particularly interesting attitude possibility permitted by the tracked vehicle according to the invention is illustrated in FIG. 5, which shows that the non-tracked body 14 is placed in a position such that the centre of gravity of load C is located vertically above the articulation axis XX' of the vehicle. As the tracked bodies 12a, 12b are slightly raised, a completely symmetrical position is obtained, in which only those parts of the tracks in the vicinity of articulation axis XX' are in contact with the ground. Thus, friction is considerably reduced and a half turn in situ of the vehicle is made easier (arrow $F_4$).

Obviously when the vehicle is not autonomous, the connection between said vehicle and the fixed control station can be provided by a wire link (with a reel on board the vehicle), or by a wireless link (e.g. of the radio frequency type).

In the case where the vehicle is remotely controlled, it is equipped with television systems formed by one or more television cameras installed on poles. It is also equipped with other exteroceptive sensors (laser telemetry, proximetry, sound, etc.).

The previously described vehicle can undergo numerous modifications without passing beyond the scope of the invention. Thus, the vehicle need only have three tracks and each or at least some of the caterpillars could have means for the autonomous articulation about the common axis XX'. Such a configuration, which has the advantage of increasing the number of attitudes which can be adopted by the vehicle, suffers from the disadvantage of increasing the number of engines and consequently the complexity of the vehicle. Finally, the vehicle can in certain cases have several non-tracked bodies.

What is claimed is:

1. A tracked vehicle comprising two to four tracked bodies and at least one non-tracked body, each of the tracked bodies having at least one track, the total number of tracks of the vehicle being three or four, the tracked bodies and the non-tracked bodies all being articulated about a common axis, wherein the vehicle also comprises means for permanently maintaining the vertical passing through the centre of gravity of the vehicle within the support polygon thereof, including control means acting on an angulation motorization means for the non-tracked body about the common axis, in order to make said angulation dependent on a position reference, wherein the control means are sensitivie to signals supplied by sensors for the relative positioning between tracked and nontracked bodies and by a vertical position sensor carried by one of these bodies, and motorization means carried by the tracked bodies and placed within envelopes defined by the tracks of said tracked bodies.

2. A vehicle according to claim 1, wherein it comprises two tracked bodies, each having two tracks, a first of said tracked bodies carrying a motorization means for advancing the tracks placed on the same side of the vehicle and a motorization means for the reciprocal angulation of the tracked bodies, the second tracked body carrying a motorization means for the advance of the tracks placed on the other side of the vehicle and a motorization means for the angulation of the non-tracked body with respect to the second tracked body.

* * * * *

UNITED STATES PATENT AND TRADEMARK OFFICE
CERTIFICATE OF CORRECTION

PATENT NO. :  4,709,773

DATED :  December 1, 1987

INVENTOR(S) :  Clement et al.

It is certified that error appears in the above-identified patent and that said Letters Patent is hereby corrected as shown below:

Title page:

In the Abstract, line 7, change "tracks" to --tracked--.

Column 1, lines 22 and 23, change "caterpillared" to --racked--;
    line 27, change "bodyis" to --body is--;
    line 67, change "tracked" to --tracks--; and
    line 67, change "caterpillar" to --tracked--.

Column 2, lines 16 and 17, change "caterpillars" to --racks--;
    line 17, change "track" to --tracked--;
    line 40, change "tracked" to --tracks--;
    line 56, change "caterpillars" to --tracks--;
    line 57, change "tracks" to --tracked--; and
    line 59, after "Marauder", insert --and--.

Column 3, line 13, change "track" to --tracked--;
    line 14, change "caterpillar" to --track--;
    line 22, change "tracks" to --tracked--;
    line 32, change "caterpillars" to --tracks--; and
    line 59, change "control" to --controls--.

Column 4, lines 9 and 10, change "caterpillars" to -tracks--;
    line 14, delete "second";
    line 17, change "tracked" to --non-tracked--;
    line 17, change "caterpillared" to --tracked--;
    line 35, after "4a", insert --to 4d--; and
    line 36, delete "to 4d".

UNITED STATES PATENT AND TRADEMARK OFFICE
CERTIFICATE OF CORRECTION

PATENT NO. : 4,709,773

DATED : December 1, 1987

INVENTOR(S) : Clement et al.

It is certified that error appears in the above-identified patent and that said Letters Patent is hereby corrected as shown below:

Column 5, line 11, change "tracked" to --track--.

Column 6, line 14, change "non-caterpillared" to --non-racked--; and line 60, change "tracked" to --tracks--.

Column 7, line 22, change "caterpillars" to --tracks--.

Signed and Sealed this

Twelfth Day of July, 1988

Attest:

DONALD J. QUIGG

Attesting Officer      Commissioner of Patents and Trademarks